United States Patent
Hyndman et al.

(10) Patent No.: US 7,761,543 B2
(45) Date of Patent: Jul. 20, 2010

(54) METHOD AND APPARATUS FOR BACKWARD AND FORWARD COMPATIBILTY IN DEVICE MANAGEMENT

(75) Inventors: Arn C. Hyndman, Ottawa (CA); Glen M. Pye, Nepean (CA); Jerome Magnet, Ottawa (JP)

(73) Assignee: Ciena Corporation, Linthicum, MD (US)

( * ) Notice: Subject to any disclaimer, the term of this patent is extended or adjusted under 35 U.S.C. 154(b) by 1350 days.

(21) Appl. No.: 10/190,528

(22) Filed: Jul. 9, 2002

(65) Prior Publication Data

US 2004/0010576 A1    Jan. 15, 2004

(51) Int. Cl.
  *G06F 15/173* (2006.01)
  *G06F 9/44* (2006.01)
(52) U.S. Cl. ................ 709/223; 717/168; 717/170; 717/171
(58) Field of Classification Search ........... 709/223; 717/174
  See application file for complete search history.

(56) References Cited

U.S. PATENT DOCUMENTS

| | | | | |
|---|---|---|---|---|
| 5,887,139 A | * | 3/1999 | Madison et al. | 709/223 |
| 5,901,320 A | * | 5/1999 | Takahashi et al. | 717/170 |
| 6,260,062 B1 | * | 7/2001 | Davis et al. | 709/223 |
| 6,332,142 B1 | * | 12/2001 | LeBlanc | 707/100 |
| 6,363,421 B2 | * | 3/2002 | Barker et al. | 709/223 |
| 6,718,377 B1 | * | 4/2004 | Bischoff et al. | 709/223 |
| 6,826,750 B1 | * | 11/2004 | Curtis et al. | 717/170 |
| 6,877,037 B1 | * | 4/2005 | Adachi | 709/227 |
| 2003/0101251 A1 | * | 5/2003 | Low | 709/223 |
| 2005/0198247 A1 | * | 9/2005 | Perry et al. | 709/223 |

* cited by examiner

*Primary Examiner*—Hassan Phillips
(74) *Attorney, Agent, or Firm*—Kent Daniels; Blake, Cassels & Graydon LLP (57) ABSTRACT

A method and system permitting a network management system to be backward and forward compatible with a range of network elements or devices, and device versions. The present invention uses a combination of versioned interface negotiation, data driven interfaces or self-describing devices, and a support matrix of management features supported by various versions of the network management system, to provide the network management system with both backward and forward compatibility. This permits a single version of a management system to be backward compatible with a series of network elements that predate the management system's release, and to be forward compatible with a series of network elements that follow the management system's release, even in the face of unpredictable changes in the devices with which the management system interacts. The invention also permits the vendor to control which features are enabled for the various combinations of network element versions and management system versions and thus how much testing is required.

23 Claims, 6 Drawing Sheets

| | Feature 1 | Feature 4 | Feature 8 | Feature 9 | Feature 10 | Feature 11 | Feature 16 |
|---|---|---|---|---|---|---|---|
| Version 1 | OFF | ON | OFF | OFF | ON | OFF | OFF |
| Version 2 | OFF | ON | OFF | OFF | ON | OFF | OFF |
| Version 3 | ON | ON | OFF | OFF | ON | OFF | ON |
| Version 4 | ON | ON | OFF | ON | ON | OFF | ON |
| Version 5 | ON | ON | ON | ON | ON | OFF | ON |
| Version 6 | ON | ON | ON | ON | ON | OFF | ON |
| Version 7 | ON | ON | ON | ON | ON | ON | ON |

METHOD AND APPARATUS FOR BACKWARD AND FORWARD COMPATIBILTY IN DEVICE MANAGEMENT

FIELD OF THE INVENTION

The present invention relates generally to device management. More particularly, the present invention relates to backward and forward compatibility in device management systems, such as telecommunications network management systems.

BACKGROUND OF THE INVENTION

Network management software must manage a range of network devices, or elements. These network devices are typically complex systems with storage, embedded processors, and their own software. To add further complexity, there can be several versions of each network element, each with its own features and capabilities requiring management. In a network management application with a broad range of network elements supported, there may be hundreds of new network elements, or network element versions, added every year. It quickly becomes unmanageable to update such network management software with the release of each new network element, or network element version. Operating a new device under a network management system that does not fully support it can result in either catastrophic failure affecting management of all network elements, such as a core dump, or inaccurate results.

One solution to this problem is to release numerous upgrades, or versions, of the network management software. Such frequent releases impose high costs on both the vendor and the customer. A less desirable solution is to release fewer versions of the network management software. This delays support for new devices or device versions. This solution reduces the costs to the vendor and customer, but may result in lost device and network management sales. A further solution is to provide frequent software patches for the network management software to add the desired device support. This solution still results in high development cost to the vendor, and maintenance costs to the customer. A further drawback of any solution that involves frequent upgrades or patches is the requirement for testing and verification before deployment. Testing each release of management software is particularly difficult as it must be tested against several releases of each network element—often resulting in hundreds of combinations to test. Testing is expensive and time-consuming, and inadequate testing can lead to undetected bugs, or defects, in a new release.

Some network management systems implement negotiated version interfaces, or protocol negotiation, to overcome the need for constant upgrades or patches. Such negotiations involve communication between the network management system and the network element using a defined interface that includes version information. The management system and the network element negotiate to establish the highest version of the interface that both understand. A disadvantage of protocol negotiation is that it does not permit the implementation of features that both the new element and the network management system can both support if they are not supported by the highest common interface version. Thus, the optimum support for a new device is not achieved. Protocol negotiation can reduce the frequency of updates required to the network management software, but it has the disadvantage that it does not reduce the requirement to test the management software against each network element version.

Data driven interfaces and self-describing devices are also known. Data driven interfaces allow the new network element to describe itself rather than having the network management system store hard-coded knowledge of the device. Often this permits the management system to support a new or updated network element without modifications. However, features that the self-describing device describes that are not supported by the network management system are not activated. Such devices also run the risk of activating an incorrect version of a feature when they are not aware of a particular version of the network management system, which can have catastrophic results. Again, self-describing interfaces reduce the frequency of updates required to network management software, but do not reduce the requirement to test the management software against each network element version.

It is, therefore, desirable to provide a method and system that permits backward and forward compatibility in a network management software application program without requiring frequent upgrades or patches, and without requiring extensive testing, while providing support for new network elements and new device versions.

SUMMARY OF THE INVENTION

It is an object of the present invention to obviate or mitigate at least one disadvantage of previous device management systems and methods. It is a particular object of the present invention to provide a method and system that permits device management systems, such as network management software applications or other device dependent application programs, to degrade gracefully and to be updated only periodically, while supporting both device versions that precede and succeed the release of the application program. It is also an object of the invention to reduce the cost incurred to support a device version by reducing the amount of verification required.

In a first aspect, the present invention provides a method for device management in a network management system. A device manager having means to enable the method is also disclosed. The method comprises receiving a network element support matrix for a network element. The network element support matrix has a set of support flags defining management features supported in each of a number of versions of the network management system. The flags in the network element support matrix that correspond to the current installed network management system version are used to enable or disable network management functions as appropriate for the given combination of network element and management system. The current installed version is determined, the appropriate set of support flags is then extracted from the support matrix, and network management support is then enabled for the management features defined in the chosen set of support flags. The support matrix of the present invention is preferably as set of support flags stored as bits in a byte array.

In a further aspect, there is provided a network management system. The network management system comprises a messaging sub-system and an activation sub-system. The messaging sub-system receives a set of support flags selected from a support matrix for a network element. The network element support matrix defines management features supported in each of a plurality of versions of the network management system. The activation sub-system receives the set of support flags from the messaging sub-system, and enables network management support for the network element, for those management features supported. Preferably, the activation sub-system selects the support flag entries corresponding to the current installed version of the network management system. The network element and management system can also include protocol negotiation to enable communications between the network management system and the network element, and a data driven interface to permit the network element to self-describe.

In yet another aspect, the present invention provides a network element for remote monitoring by a network management system. The network element includes a network element support matrix having a set of support flags for each of a plurality of versions of the network management system. A network element messaging sub-system, connected to the network management system, transmits the set of support flags to the network management system. In a presently preferred embodiment, the network element also includes a lookup sub-system for receiving the current installed network management system version from the network element messaging sub-system, and for parsing the network element support matrix to select the set of support flags entries corresponding to the current version.

The present invention can be implemented, in its many aspects, as one or more computer-readable program products provided on a computer-readable medium.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system permitting a network management system to be backward and forward compatible with a range of network elements or devices, and device versions. The present invention uses a combination of versioned interface negotiation, data driven interfaces or self-describing devices, and a support matrix to provide the network management system with both backward and forward compatibility. This permits a single version of a management system to be backward compatible with a series of network elements that predate the management system's release, and to be forward compatible with a series of network elements that follow the management system's release, even in the face of unpredictable changes in the devices with which the management system interacts.

Figure 1:
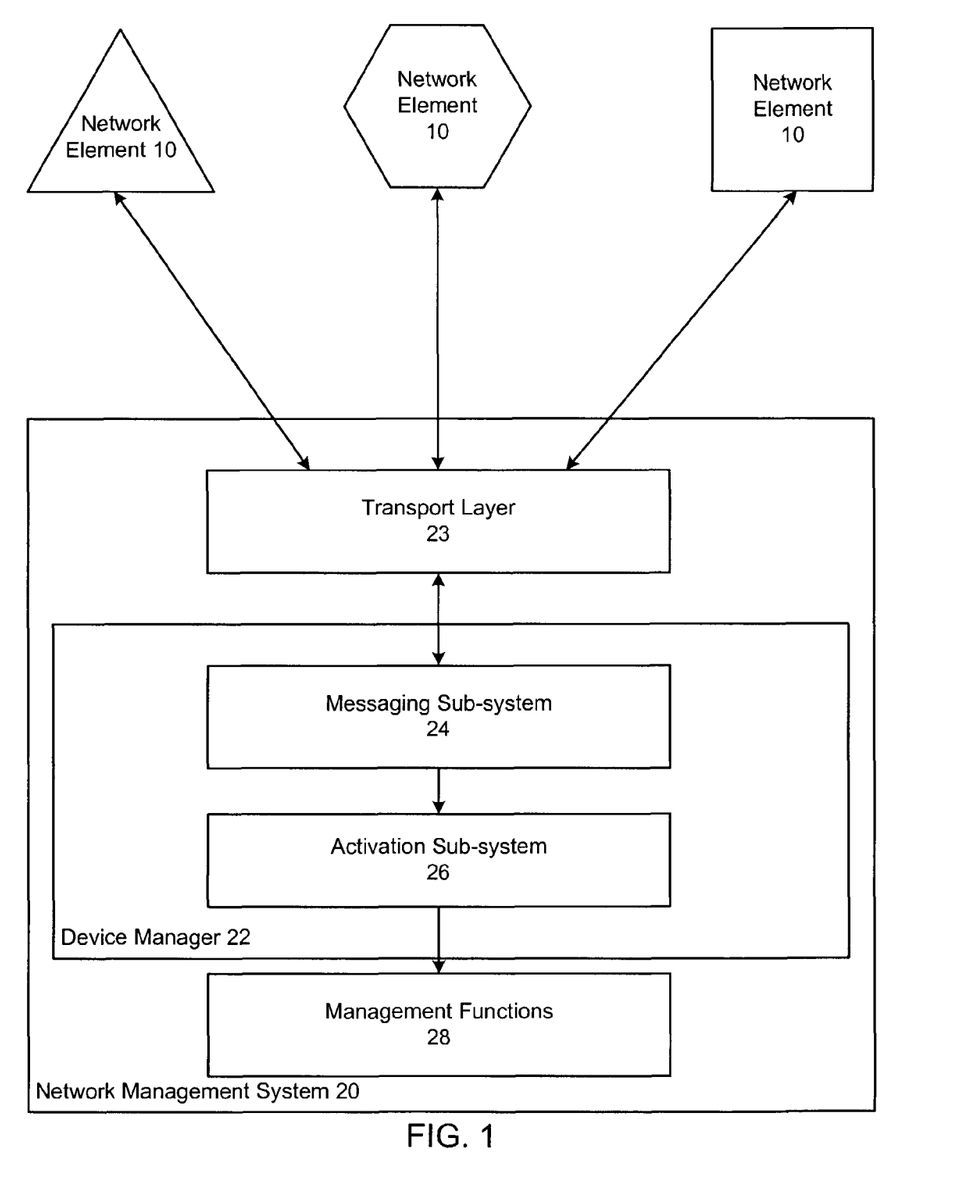
FIG. 1 is a block diagram of a network management system, including a device manager, and various network elements, according to the present invention.

FIG. 1 shows a block diagram of a network management system 20 networked to a number of network elements 10. The network elements 10, or devices, can be any applicable devices installed in a network. For example, in an optical network, typical network devices include optical switches, optical amplifiers, gateways and routers. Network management system 20, such as Nortel Network Limited's Preside™ AP operating in a Unix™ environment, is generally enabled as a software application program, and provides management features consistent with the network and network elements that it manages. These features can include, for example, fault detection, traffic detection, power management, graphical device views, alarm detection, network connections, backup, etc. Typically, as new versions of network management system 20 are released, the number of management features increases, and/or the feature content becomes richer.

Network management system 20 includes a device manager 22 that communicates with the network elements 10 through its transport layer 23, and determines the suitable support level for each network element 10. Device manager 22 is, in most contemplated instances, a software component that implements the functions in the following description. In a presently preferred embodiment, device manager 22 includes a messaging sub-system 24 and an activation sub-system 26. The messaging sub-system 24 enables communication between the network elements 10 and network management system 20, and passes the information received to activation sub-system 26. Activation sub-system 26 determines the management features to be activated for a given network element, in accordance with the entries in a network element support matrix 30 (see FIG. 2), and passes this information to management functions 28, in the network management system 20 to activate the features.

Preferably, device manager 22 also includes a negotiated version interface in order to enable basic communications between the network element and the network management system. The device manager 22 may also use a data driven interface or self-describing features in order to increase the number of functions that can be enabled using the support matrix. In a preferred embodiment, the use of the support matrix 30 is combined with versioned interfaces, data driven interfaces, and self-describing features. These elements enable basic backward and forwards communications and reduce the number of required releases of the network management system 20. The support matrix, protocol negotiation, and self-description capabilities can be compliant with, and applied to, almost any underlying transport layer. Examples include TL1, CORBA, and XDR. In the preferred embodiment, the underlying transport layer enables remote management of network elements. Generally, the present invention can be implemented in any software development language, and can operate with any communications protocol, and on any computing or network hardware.

Figure 2:
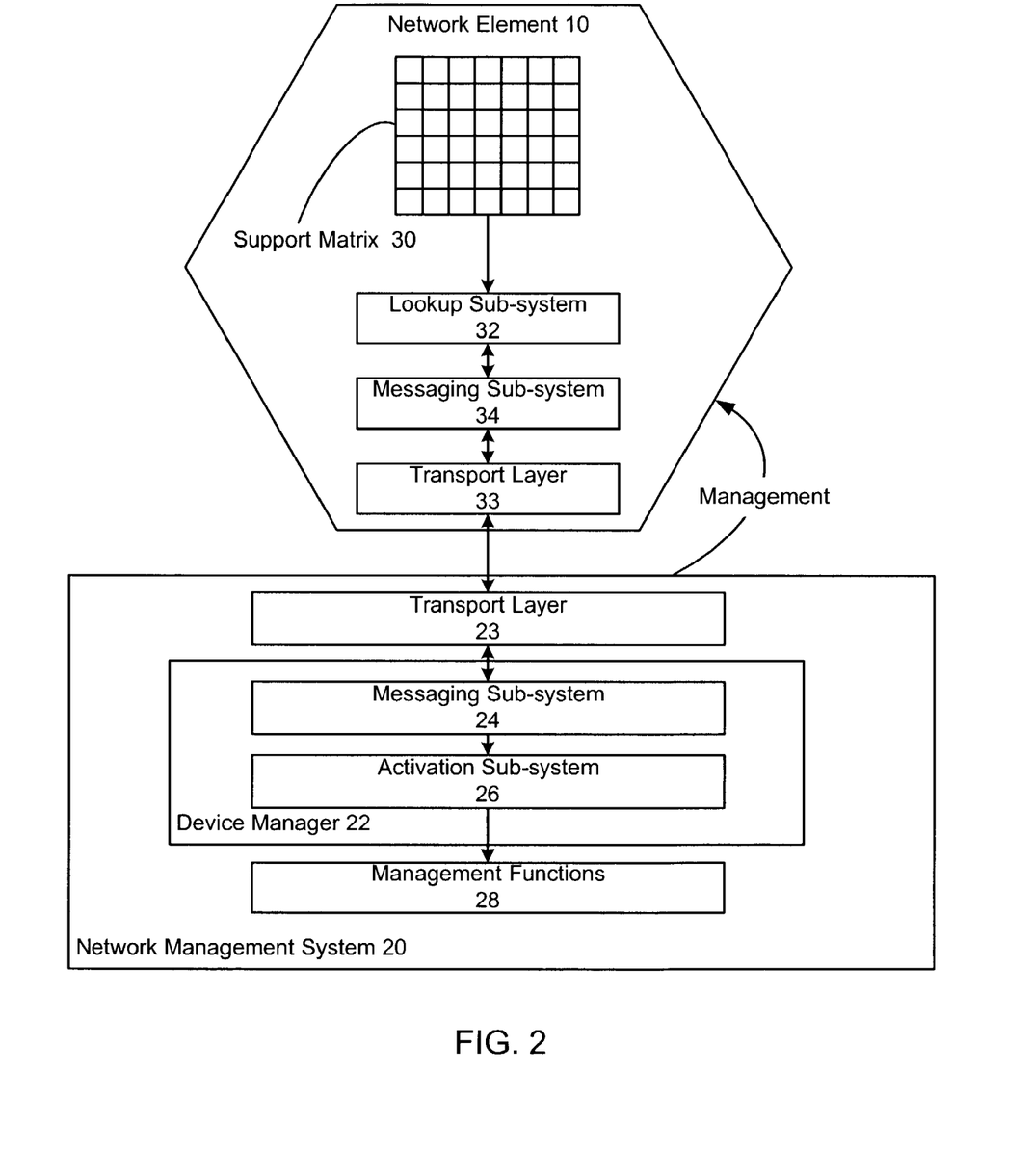
FIG. 2 is a block diagram of one of the network elements of FIG. 1, showing a network element support matrix and its transmission from to the device manager.

Referring to FIG. 2, a network element 10 is shown in greater detail. In accordance with the present invention, network element 10 includes a network element support matrix 30, or table, that lists the management features supported by two or more versions of network management system 20. Generally, the network element support matrix 30 is stored on the network element 10, and, in a presently preferred embodiment, consists of a set of Boolean flags for each network management feature and each version of the network management system as known at development time of the network element 10, or subsequently if the network element support matrix 30 is capable of being updated. The network element may store, and/or update, this data using any appropriate storage means, such as on disk, in flash memory, EPROM, or RAM. In a presently preferred embodiment, the network element support matrix 30 is provided as a file stored on the network element and installed with the network element software. The support matrix 30 can also be stored at another location such as at an Internet-accessible site, or elsewhere in the network.

In addition to its support matrix 30, each network element 10 also includes a lookup sub-system 32 that loads the support matrix 30, extracts information from the support matrix 30, and passes the extracted information to a network element messaging sub-system 34. The network element messaging sub-system 34 communicates with the network management messaging system 24, through their respective transport layers 23 and 33. Upon receipt and/or activation within device manager 22, management information may be returned to the network element, if necessary, as indicated by the management arrow.

Figure 3:
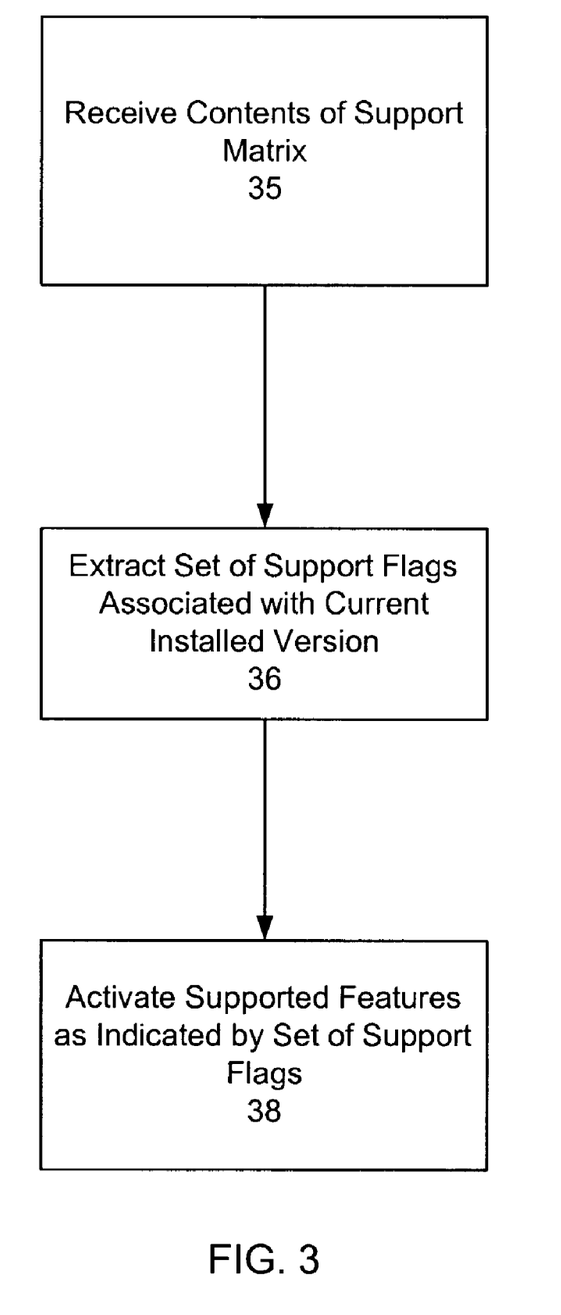
FIG. 3 is a flowchart of the method of the present invention.

Generally, the method of the present invention, as illustrated in FIG. 3, comprises loading, receiving, or otherwise determining, the contents of a network element support matrix 30 at step 35, parsing the support matrix 30 to extract a set of support flags associated with the currently installed version of network management system 20 at step 36, and activating supported network management features in accordance with the determined set of support flags at step 38. In a presently preferred embodiment, the set of support flags is provided as an row in support matrix 30 that corresponds to the current installed version of network management system 20 The set, or series, support flags indicates which features should be turned on or off for the network element to activate the desired level of network management support. Once the set of support flags has been determined, the appropriate support flag in the set are used by activation sub-system 26 to turn the features on or off, as appropriate. In a presently preferred embodiment, support flags are single data bits indicating an 'on' or 'off' state for the various management features. However, it is fully within the contemplation of the inventors that support flags can be stored in other representations, such as multibit data fields, structured XML, and multistate data (i.e. tristate symbols).

Figure 4:
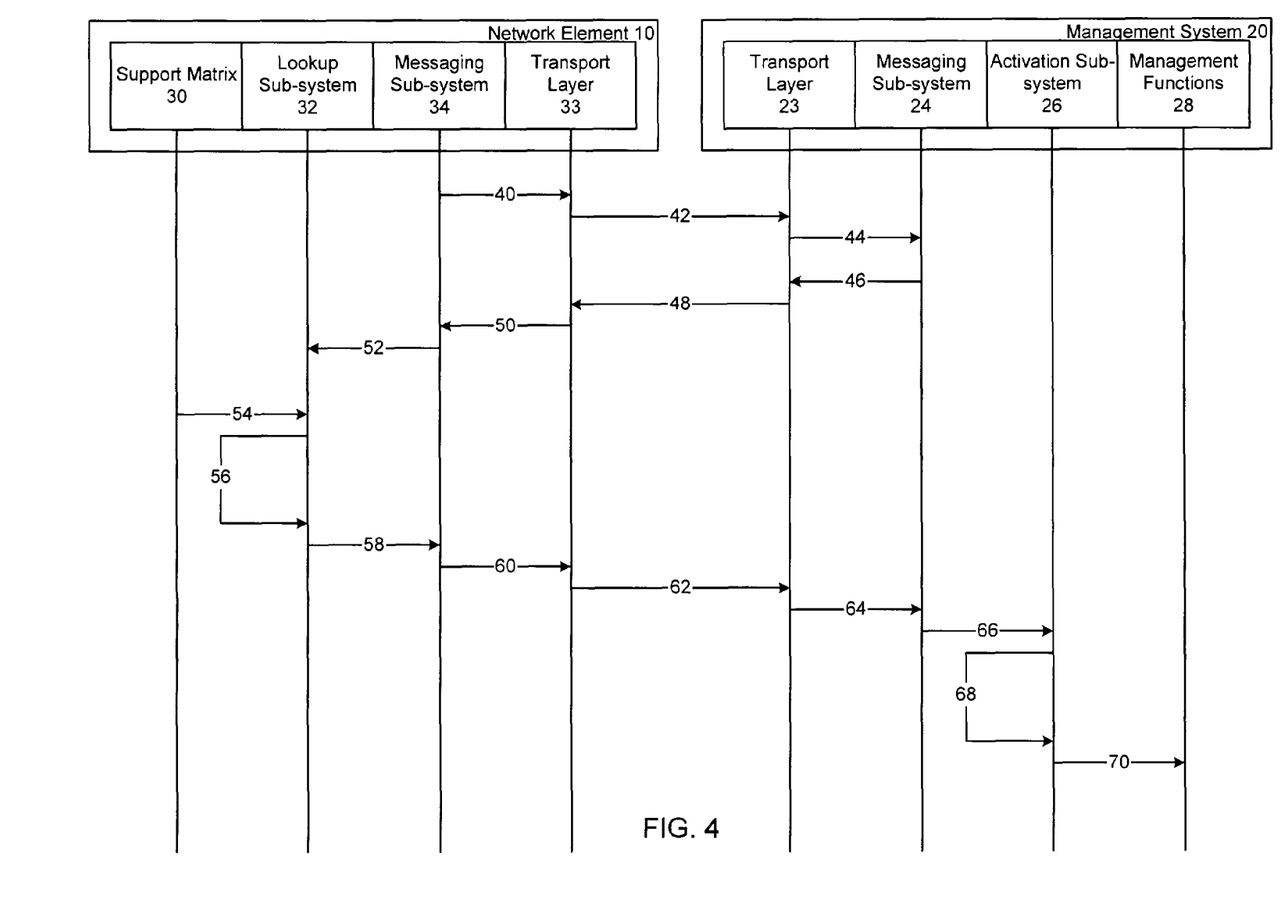
FIG. 4 is a message sequence chart according to the present invention.

An example of this method will now be described with reference to the messaging sequence chart of FIG. 4. Upon establishing a connection to the network management system 20, a new or updated network element 10 initiates the method of the present invention. For example, as part of a predefined initialization routine, the network element can connect to the network management system 20. As indicated by arrows 42, 44, and 46, network element messaging sub-system 34 transmits the network element type and version to the management system messaging sub-system 24, via the respective transport layers 33, 23, using messaging protocols as determined by the network management system and network element capabilities. Network management messaging sub-system 24, responds by transmitting the management system version to the network element messaging sub-system 34, as shown by arrows 46, 48 and 50.

As shown by arrow 52, messaging sub-system 34 passes the version information, for the current installed network management system 20, to lookup sub-system 32. Lookup sub-system 32 meanwhile reads or loads support matrix 30, as indicated by arrow 54. Lookup sub-system 34 then looks up, or extracts, a set of support flags in the support matrix that corresponds to the current installed network management system version, as indicated by arrow 56. These extracted flags are then sent to activation sub-system 26, as shown by arrows 58, 60, 62, 64 and 66. Support matrices in accordance with the present invention can be used in situations where the support matrix stored on a network element does not contain a set of support flags for the current installed version of the management system. For example, each support matrix can include a row that is intended for versions greater than the last version known at the time the network element support matrix was created. This generic set of flags intended for later versions is, for the purposes of interpretation of the present invention, included in the definition of a set of support flags for the current installed version.

As indicated by arrow 68, activation sub-system 26 parses the data structure holding the set of support flags, typically stored in the form of a byte array, to extract the flags indicating the management features to be supported in the current installed version of the network management system. As shown by arrow 70, activation sub-system 26 then passes the extracted flags to the management functions 28 where network management features are activated or deactivated in accordance with the support flags.

In a presently preferred embodiment, support matrix 30 is a byte array, and the support flags are encoded as bits in the byte array for efficient storage. The set of support flags transmitted from the network element 10 to the network management system 20 are also preferably transmitted as a series of bits in a byte array to reduce bandwidth requirements. In both cases, the position of the bits in the array is used to determine which network management features are to be activated or de-activated. This compact format for the support matrix 30 and support flags limits the consumption of limited resources in the network element 10.

In a further embodiment of the present invention, support matrix 30 can be sent directly to network management system 20, and the support flags extracted by activation sub-system 26, rather than lookup sub-system 32. Support matrix 30 can be sent as a single byte array, or can be sent to activation sub-system 26 in two stages: first, a management feature list is sent, followed by transmission of a byte array of support flag entries for a number of versions of the network management system 20. In this embodiment, network management system version information does not need to be transmitted to the network element.

Figure 5:
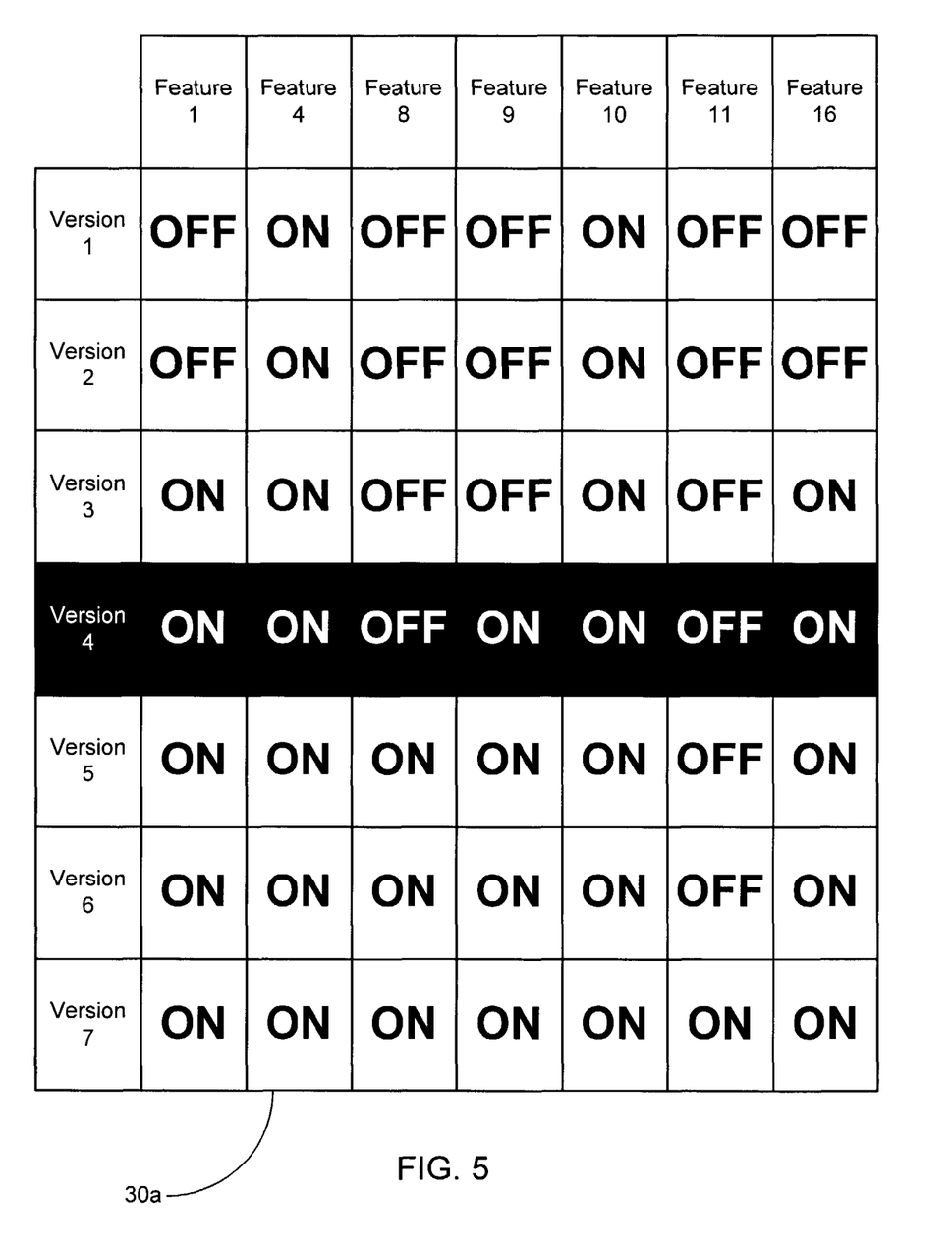
FIG. 5 is an illustration of an embodiment of a network element support matrix according to the present invention.

An exemplary embodiment of a support matrix and the activation of supported features according to the present invention will now described with reference to FIG. 5. FIG. 5 shows a network element support matrix 30a defining the state (either 'on' or 'off') for a series of management features (Features 1, 4, 8, 9, 10, 11 and 16) in each of seven versions of a network management system. The states are, preferably, determined by the designers of the network element in accordance with rules and protocols set by the designers of the network management system. In the present example, the current installed network management system 20 in operation is Version 4, as indicated by the highlighted entry in the network element support matrix. When lookup sub-system 32 receives support matrix 30a, it locates the entry for Version 4. The support flags in the Version 4 entry are then passed to activation sub-system 26, which determines, in accordance with the support flags, that Features 1, 4, 10 and 16 are to be enabled, and Features 8 and 11 are to be disabled.

Figure 6:
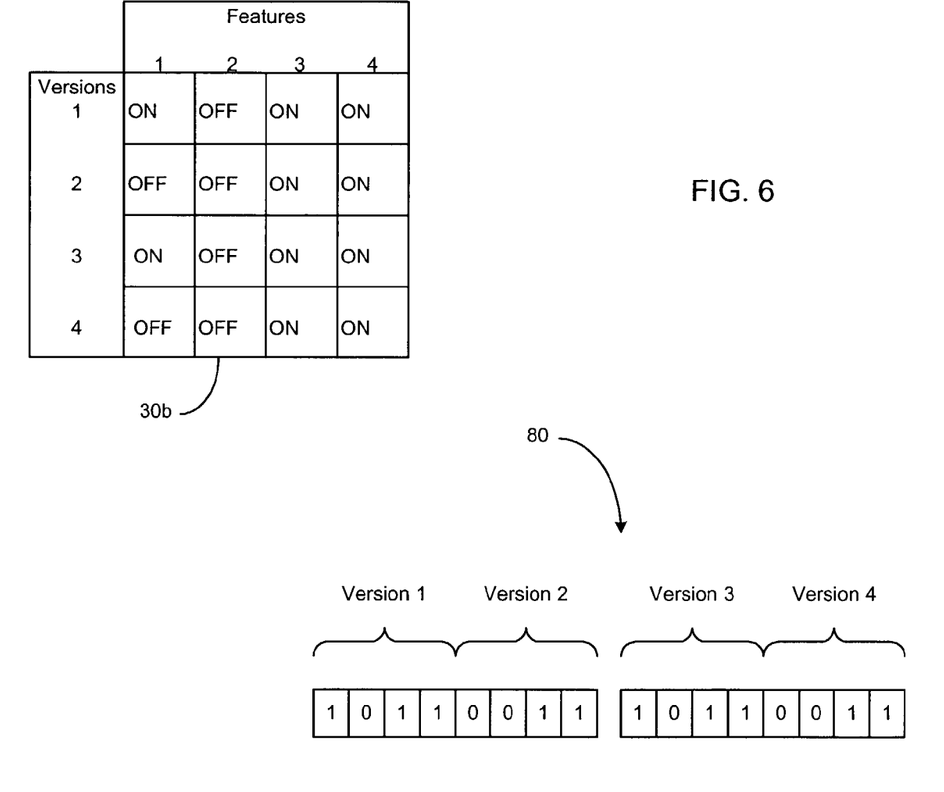
FIG. 6 illustrates storage of a network element support matrix according to the present invention as bits in byte array.

FIG. 6 shows how a support matrix 30b is stored as a byte array in accordance with an embodiment of the present invention. The support flag entry for four features (Features 1, 2, 3 and 4) are listed in the matrix for each of four versions (Versions 1, 2, 3 and 4) of a network management system. Byte array 80, consisting of two bytes, stores the feature values as bit entries ('1' for 'on'; '0' for 'off'). Each support flag entry can also be stored and transmitted as a byte array, but will only include the bit entries relevant to the particular version of interest.

Embodiments of the present invention can be implemented as a computer-readable program product, or part of a computer-readable program product, for use in the network management system, and/or the network element. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art will appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer-readable program product may be distributed as a removable medium with accompanying printed or electronic documentation (e.g., shrink-wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer-readable program product) and hardware. Still other embodiments of the invention may be implemented as entirely hardware, or entirely software (e.g., a computer-readable program product).

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

The present invention has significant value to vendors of any device management system and to vendors of new devices. Its key value is to enable network management for a new network device, or device version, using the existing management system. This forward compatibility means that the customer is not required to upgrade or update the network management system, which means faster acceptance of new hardware devices. Likewise, effortless backwards compatibility is provided for older network elements that a customer may not wish to replace. The use of this invention allows the vendor to control which features are activated in the network management system for any combination of network element and management system versions. This allows the vendor to turn off functions that could result in core dumps or other incorrect behaviour of the network element or management system. It also allows the vendor to determine how much verification is required for any particular pairing of network element and management system versions. Reducing the amount of verification can significantly reduce the cost incurred to support a device version. If the particular combination is infrequently deployed, then the set of functions activated, and thus verified, can be reduced to only those that will be used in those specific deployments. Alternatively, customers can be charged for the activation and verification of specific features where only a minimum set is turned on by default.

As will be appreciated by those of skill in the art, de-coupling support determination provides a number of advantages over prior network management systems. Because new network elements can provide a list of features that should be supported by various device manager versions, the device manager is essentially device agnostic. This allows new network elements, and network element updates to be released without requiring new device manager versions or patches. This de-coupling of the release schedule allows longer development cycles for device managers which allows for improved testing, and also allows for rapid network element release schedules.

The use of data driven interfaces and self-description features on the network element allows the network management system not to be required to store a description of the network element, so new network elements can be introduced into a network without a substantial overhaul of the support infrastructure.

This de-coupled support structure allows any network element to connect to the network management system. This offers network element developers the ability to have their device monitored, without having to develop their own network management system or even enhance an existing network management system, whereas in prior methods, only the devices specifically supported by the network management system could be monitored.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for device management in a network management system, comprising:

receiving, automatically upon initialization of a network element, a single network element support matrix represented as a byte array, from the network element, the network element support matrix having a set of support flags for each of a plurality of versions of the network management system, the support flags being represented as bits in the byte array, and each set of support flags defining at least one management feature supported in each of the plurality of versions to enable interoperation of the network element and the network management system; and upon receipt of only the single network element support matrix, extracting therefrom the set of support flags associated with a current installed version of the network management system and activating the at least one management feature supported by the current installed version as defined in the extracted set of support flags, without transmitting any network management system version information to the network element for negotiation.

2. The method of claim 1, wherein receiving the network element support matrix includes retrieving it from storage means within the network element.

3. The method of claim 1, wherein extracting the set of support flags associated with the current installed version includes extracting a row of the network element support matrix.

4. The method of claim 3, wherein the row is represented as byte array.

5. A network management system, comprising:

a messaging sub-system, executing computer-readable instructions stored in computer-readable memory, for automatically receiving from a network element at initialization, a single network element support matrix, represented as a byte array, having a set of support flags for each of a plurality of versions of the network management system, the support flags being represented as bits in the byte array, and each set of support flags defining at least one management feature supported in its respective version to enable interoperation of the network element and the network management system; and an activation sub-system, executing computer-readable instructions stored in computer-readable memory, for receiving, from the messaging sub-system, only the single network element support matrix, and, upon receipt of the single network element support matrix, extracting therefrom the set of support flags associated with the current installed version of the network management system and activating the at least one management feature supported in the current installed version without transmitting any network management system version information to the network element for negotiation.

6. The network management system of claim 5, wherein the network element support matrix includes a feature list and a plurality of support flags corresponding to the availability of each management feature in the feature list for each of the plurality of versions.

7. The network management system of claim 5, further including protocol negotiation means to communicate between network elements and the network management system.

8. The network management system of claim 5, further including a data driven interface to permit the network element to self-describe.

9. The network management system of claim 5, wherein the network element includes self-description capabilities.

10. A network element for remote monitoring by a network management system, comprising:

a single network element support matrix, stored in computer-readable memory, having a set of support flags for each of a plurality of versions of the network management system, each set of support flags being a row in the network element support matrix, wherein the row is a byte array, each bit in the byte array representing a support flag, and each set of support flags defining management features supportable in its respective version;

a network element messaging sub-system, operatively in connection to the network management system, for automatically transmitting the single network element support matrix to a currently installed version of the network management system upon initialization of the network element to permit, upon receipt of only the single network element support matrix, extraction of the set of support flags corresponding to the currently installed version of the management support system to enable interoperation of the network element and the network management system without transmitting any network management system version information to the network element for negotiation; and a lookup sub-system for receiving a current installed network management system version from a network element messaging sub-system, and for parsing the network element support matrix to select the set of support flags corresponding to the current installed network management system version.

11. The network element of claim 10, wherein the network element support matrix is stored as a byte array.

12. The network element of claim 10, wherein the network element support matrix is stored in the network element.

13. A tangible computer-readable medium having stored thereon executable instructions for execution by a computer system, for providing device management in a network management system, comprising:

a network management messaging module for causing the computer system to receive, from a network element at initialization, a single network element support matrix, represented as a byte array, having a set of support flags represented as bits in the byte array, and defining supported management features for each of a plurality of versions of the network management system; and an activation module, communicating with the messaging module, for causing the computer system, upon receipt of only the single network element support matrix, to extract therefrom the set of support flags for a currently installed version of the network management system, and to activate the supported management features for the current installed version without transmitting any network management system version information to the network element for negotiation.

14. The computer-readable program medium of claim 13, wherein the network element support matrix includes a feature list and a plurality of sets of support flags corresponding to the availability of each management feature in the feature list for each of a plurality of supported versions.

15. The computer-readable program medium of claim 13, wherein the activation module includes means for selecting one the sets of support flags corresponding to the current installed version of the network management system.

16. A network management system, comprising:

means for receiving, automatically upon initialization of a network element, a single network element support matrix, represented as a byte array, from the network element, the network element support matrix including a set of support flags for each of a plurality of versions of the network management system, the support flags being represented as bits in the byte array, and each set of support flags defining at least one management feature supported in each of the plurality of versions to enable interoperation of the network element and the network management system;

means for determining a current installed version of the plurality of versions of the network management system;

means for, upon receipt of only the single network element support matrix, extracting therefrom the set of support flags associated with the current installed version of the network management system; and means for activating the at least one management feature supported by the current installed version as defined in the extracted set of support flags without transmitting any network management system version information to the network element for negotiation.

17. The network management system of claim 16, further including means for protocol negotiation to enable network element to network management system communications.

18. The network management system of claim 16, further including means for permitting the network element to self-describe.

19. The network management system of claim 16, further including means for self-describing in the network element.

20. The network management system of claim 16, wherein the means for determining the network element support matrix includes means for loading it from storage means within the network element.

21. The network management system of claim 16, wherein the means for determining the current installed version includes means for receiving version information from the network management system.

22. The network management system of claim 16, wherein the means for extracting the set of support flags associated with the current installed version includes means for extracting a row of the network element support matrix.

23. A device management method for managing a device in a network management system, comprising:
  steps for receiving, from a network element at initialization, a single network element support matrix, represented as a byte array, the single network element support matrix having a set of support flags represented as bits in the byte array, and defining supported management features for each of a plurality of versions of the network management system; and
  steps for, upon receipt of only the single network element support matrix, extracting therefrom the set of support flags for a currently installed version of the network management system, and activating the supported management features for the current installed version without transmitting any network management system version information to the network element for negotiation.

* * * * *